(12) United States Patent
Soane et al.

(10) Patent No.: US 8,758,629 B2
(45) Date of Patent: Jun. 24, 2014

(54) TREATMENT OF OIL-CONTAMINATED SOLIDS

(75) Inventors: David S. Soane, Chestnut Hill, MA (US); Robert P. Mahoney, Newbury, MA (US); Lauren Fortin, Stow, MA (US); John H. Dise, Kirkland, WA (US)

(73) Assignee: Soane Energy, LLC, Cambridge, MA (US)

( * ) Notice: Subject to any disclaimer, the term of this patent is extended or adjusted under 35 U.S.C. 154(b) by 460 days.

(21) Appl. No.: 13/039,732

(22) Filed: Mar. 3, 2011

(65) Prior Publication Data

US 2012/0055852 A1 Mar. 8, 2012

Related U.S. Application Data

(60) Provisional application No. 61/310,041, filed on Mar. 3, 2010.

(51) Int. Cl.
*C02F 1/00* (2006.01)
*B09C 1/00* (2006.01)
*B09C 1/08* (2006.01)
*C09K 3/32* (2006.01)

(52) U.S. Cl.
CPC . *B09C 1/002* (2013.01); *B09C 1/08* (2013.01); *C09K 3/32* (2013.01)
USPC .................................. 210/747.8; 405/128.75

(58) Field of Classification Search
CPC ............ B09C 1/002; B09C 1/08; B09C 1/00; C09K 3/32
USPC .................................. 210/747.8; 405/128.75
See application file for complete search history.

(56) References Cited

U.S. PATENT DOCUMENTS

| | | | |
|---|---|---|---|
| 4,040,866 A | 8/1977 | Mondshine | |
| 4,216,836 A * | 8/1980 | Rayborn | 175/66 |
| 4,704,213 A * | 11/1987 | Delhommer et al. | 175/72 |
| 4,744,889 A | 5/1988 | Kruyer | |
| 5,035,804 A | 7/1991 | Stowe | |
| 5,156,686 A | 10/1992 | Van Slyke | |
| 5,582,118 A * | 12/1996 | Atkins et al. | 110/346 |
| 5,788,781 A | 8/1998 | Van Slyke | |
| 5,911,541 A | 6/1999 | Johnson | |
| 6,153,017 A * | 11/2000 | Ward et al. | 134/10 |
| 6,846,420 B2 * | 1/2005 | Reddy et al. | 210/710 |
| 6,978,851 B2 * | 12/2005 | Perez-Cordova | 175/206 |
| 7,192,527 B2 * | 3/2007 | Reddy | 210/708 |
| 7,297,279 B2 * | 11/2007 | Johnson et al. | 210/669 |
| 7,381,332 B2 | 6/2008 | Pena et al. | |
| 7,438,142 B2 * | 10/2008 | Butler et al. | 175/66 |
| 2003/0056987 A1 * | 3/2003 | Cordova | 175/57 |
| 2003/0098180 A1 * | 5/2003 | Growcock et al. | 175/65 |
| 2003/0108462 A1 * | 6/2003 | Oskoui | 423/27 |
| 2004/0118784 A1 * | 6/2004 | Reddy et al. | 210/723 |
| 2005/0151289 A1 | 7/2005 | Rink et al. | |
| 2006/0163177 A1 * | 7/2006 | Johnson et al. | 210/799 |
| 2007/0299149 A1 | 12/2007 | Goldshtein et al. | |

* cited by examiner

*Primary Examiner* — Gregory Webb

(74) *Attorney, Agent, or Firm* — Elmore Patent Law Group, P.C.; Mahreen Chaudhry Hoda, Esq.; Carolyn S. Elmore, Esq.

(57) ABSTRACT

The disclosure pertains to systems and methods for removing hydrocarbon contaminants from a contaminated solid using an environmentally benign extractant and an oleophilic absorber, where the environmentally benign extractant and the oleophilic absorber are separate components.

28 Claims, No Drawings

TREATMENT OF OIL-CONTAMINATED SOLIDS

RELATED APPLICATION

This application claims the benefit of U.S. Provisional Application No. 61/310,041 filed Mar. 3, 2010. The entire teachings of the above-referenced application are incorporated by reference herein.

FIELD OF THE APPLICATION

This application relates generally to remediation of oil-contaminated solids.

BACKGROUND

A number of solid particulate materials can become contaminated with oily materials, requiring remediation. Solids obtained from well drilling operations, produced solids from oil production, contaminated soils, or other solid agents (inorganic and organic) can be exposed to oil, whether deliberately or inadvertently. Cleaning the solid materials and providing an environmentally-friendly disposal system are challenges in the industry.

As an example, cuttings produced in during well-drilling can be contaminated with oil, requiring remediation. Cuttings are shavings of earth-based solids formed by the action of the drill within the formation. Cuttings can include materials such as clay, shale, silt, ash, fragmented rock, minerals, soil, dirt, mud, sand, gravel, and the like.

In well drilling, a drilling fluid, also called "drilling mud," is circulated through a pipe to lubricate the drill bit during drilling. There are two general categories of drilling mud: water-based mud, and oil-based mud. Formulations for oil-based muds comprise synthetic oils or other synthetic lubricating fluids, as well as refined and traditional oils. An oil-based drilling fluid typically contains oil or a synthetic hydrocarbon as the continuous phase, and may further contain water dispersed in the oil phase by emulsification, forming a water-in-oil or "invert" emulsion.

Oil or synthetic fluid-based muds are useful for drilling in formations such as swelling or sloughing shales, salt, gypsum, anhydrite or other evaporate formations, hydrogen sulfide-containing formations, and they may be useful when drilling under hot conditions (e.g., where temperatures within the borehole approach or exceed the boiling point of water). For deep-sea drilling (e.g., for wells at water depth greater than about 1500 feet deep), for example, oil-based drilling muds are preferred because of the extreme depth that these wells reach, with extreme temperature and pressure conditions. It is understood that temperatures in subterranean formations generally rise about 1 degree C. per hundred feet of depth, so that higher temperatures will be encountered as wells are drilled deeper. Oil based muds generally allow faster penetration rates during drilling, allowing a faster well completion. This benefit is important in off-shore drilling, where the operating expenses of a drilling platform can be measured in the hundreds of thousands of dollars per day. Oil based muds allow horizontal or high angle drilling with less risk of structural collapse of the wellbore. Oil based drilling muds typically comprise an oil-continuous phase, and may also contain as a discontinuous phase various aqueous solutions (such as sodium, potassium or calcium brines), along with other additives (e.g., rheology modifiers like oleophilic clays, weighting agents like barium sulfate, fluid loss control agents and the like).

When oil-based muds are used for drilling, the cuttings formed during the drilling process are coated with an oily residue derived from the drilling mud itself. The cuttings are carried back to the surface by a return flow of drilling mud. Upon their return to the surface, the cuttings are typically cleaned to remove the drilling mud that coats them. Conventional methods like shale shakers, mud cleaners, and centrifuges can separate the drilling mud from the cuttings so that the mud can be reused. The cleaned cuttings must then be disposed of, typically by discharging into the surrounding environment. Disposal is problematic, though, because the cuttings are still contaminated by a residual amount of hydrocarbons from the drilling fluid and hydrocarbons from the formation. This problem is exacerbated on offshore drilling platforms, where disposal of contaminated cuttings into the ocean environment can be hazardous to marine life.

Current regulations in certain oil-producing jurisdictions (e.g., the North Sea legislation OSPAR 2000/3) require that drill cuttings contain less than 1% total petroleum hydrocarbon (TPH) in order to be disposed on-site. Current on-site mechanical methods of mud and cutting separation reduce the oil content to 3-10% TPH. If the cuttings cannot be treated to conform to the regulatory requirements of less than 1% TPH, they must be disposed of in environmentally-protective ways, typically by removing them from the drilling site for specialized disposal. Disposal methods in accordance with such regulations can be costly and capital-intensive. There remains a need in the art, therefore, for an efficient method for reducing the TPH content of drill cuttings to allow their disposal off-shore and on-shore in conformity with environmental protection regulations.

SUMMARY

Disclosed herein are systems for removing a hydrocarbon contaminant from a contaminated solid, comprising an environmentally benign extractant and an oleophilic absorber, wherein the environmentally benign extractant and the oleophilic absorber are separate components of the system. In embodiments, the contaminated solid comprises drilling cuttings. In embodiments, the environmentally benign extractant is a biodegradable material or a naturally-derived material. In embodiments, the oleophilic absorber comprises a substrate bearing an oleophilic coating. In embodiments, the oleophilic absorber comprises an uncoated oleophilic substance. In embodiments, oleophilic absorber comprises an oil-swellable oleophilic substance. In embodiments, the oleophilic absorber comprises an oleophilic material selected from the group consisting of crumb rubber, modified crumb rubber, thermoplastic elastomers and polymers, and copolymers comprising monomers selected from the group consisting of styrene, butadiene, isoprene, ethylene, and vinyl acetate, and a combination of any of thereof. In embodiments, the oleophilic absorber is less dense than water. In embodiments, the oleophilic absorber comprises a polymeric bead.

Also disclosed herein are methods for separating a hydrocarbon contaminant from a contaminated solid, the contaminated solid comprising a solid substrate and the hydrocarbon contaminant, the method comprising providing an environmentally benign extractant, mixing the environmentally benign extractant with the contaminated solid to produce a treated solid wherein the hydrocarbon contaminant is separable from the solid substrate, providing an oleophilic absorber capable of extracting the hydrocarbon contaminant from the solid substrate, mixing the oleophilic absorber with the treated solid to extract the hydrocarbon contaminant from the solid substrate onto the oleophilic absorber, thereby forming a spent oleophilic absorber, wherein the spent oleophilic absorber comprises the hydrocarbon contaminant, and separating the spent oleophilic absorber from the treated solid, thereby separating the hydrocarbon contaminant from the solid substrate. In embodiments, the contaminated solid comprises drilling cuttings. In embodiments, the oleophilic absorber comprises an oleophilic material on a substrate surface. In embodiments, the oleophilic absorber comprises coated beads, wherein the coated beads are coated with an oleophilic material. In certain practices, the method further comprises separating the hydrocarbon contaminant from the spent oleophilic absorber. In certain practices, the method further comprises recovering the environmentally benign extractant from the spent oleophilic absorber. In certain practices, the method further comprises disposing of the spent oleophilic absorber.

Further disclosed herein are methods of treating drilling cuttings contaminated with a hydrocarbon contaminant, comprising: Step (a), washing the drilling cuttings with an environmentally benign extractant, and Step (b), adding an oleophilic absorber to the drilling cuttings after Step (a), wherein the oleophilic absorber absorbs the hydrocarbon contaminant from the drilling cuttings. In certain practices, the method further comprises Step (c), segregating the oleophilic absorber from the drilling cuttings after Step (b) is carried out. In certain practices, the method further comprises Step (d), separating the hydrocarbon contaminant from the oleophilic absorber after Step (c). In certain practices, the method further comprises disposing of the oleophilic absorber after Step (c).

DETAILED DESCRIPTION

A. Removal of Hydrocarbon Contaminants from the Surface of Solid Materials

Disclosed herein are systems and methods for removing hydrocarbon contaminants from the surface of solid materials by using a biodegradable extractant, an oleophilic absorber, or a combination of these two processes. As used herein, the term "hydrocarbon contaminants" refers to any hydrocarbon-based material whose removal from a solid is desired for clean-up or remediation purposes. A hydrocarbon contaminant can include materials such as natural or synthetic oils, fats, greases or waxes, whether derived from animal, vegetable or mineral sources; in embodiments, hydrocarbon contaminants can include synthetic oils and greases having hydrocarbon groups, such as organopolysiloxanes (silicones) and mixtures thereof. In embodiments, the hydrocarbon contaminant can comprise a substantially hydrocarbonaceous material such as an oil or grease, for example, a natural or synthetic petroleum product, such as crude oil, heating oil, bunker oil, kerosene, diesel, gasoline, naptha, shale oil, coal oil, lubricating oil, paraffin, paraffin blends, internal olefins, solvents, waxes, lubricating greases, $C_{16}$-$C_{18}$ alkene blends, and combinations thereof. A hydrocarbon contaminant, in accordance with these systems and methods, coats, permeates, attaches to or otherwise resides upon the surface of a solid material where its presence is undesirable.

A solid material that is contaminated with a hydrocarbon contaminant may be a particulate material of any size, or a natural or artificial surface, for example of a formed article or an architectural formation. In embodiments, the solid material can comprise insoluble organic materials, alone or combined with inorganic materials, such as cellulosic materials (sawdust, straw, bark, etc.) alone or in combination with inorganic materials (e.g., in the soil). In embodiments, the solid material comprises an inorganic material such as rocks, gravel, dirt, soil, ash, sand, drill cuttings, and the like. In certain embodiments, the solid material comprises particulate matter, sized, for example, in the millimeter range. Such particulate solid material may be produced, for example, when drillings cuttings are segregated by size on a shaker screen.

In an exemplary embodiment, drilling cuttings comprise the solid material contaminated with a hydrocarbon contaminant, derived, for example, from the oil-based mud (OBM) used for the drilling operation. Hydrocarbon contaminants found on drill cuttings can also include other drilling additives from the drilling process, along with hydrocarbons derived from the geological formation or the well itself. In addition, the systems and methods disclosed herein can remove other fine particulate components of oil-based drilling muds (e.g., clay solid fines) from the surfaces of drillings cuttings.

In embodiments, these systems and methods provide for an environmentally benign extractant to be added to the hydrocarbon-contaminated solid material, with the addition of an oleophilic absorber to sequester the hydrocarbon contaminant, thereby remediating the contaminated solid. As used herein, the term "environmentally benign extractant" refers to a range of extracting agents that are biodegradable (i.e., subject to degradation under environmental conditions), biocompatible (non-toxic and non-bioaccumulating), and/or naturally-derived (derived from a natural animal, vegetable or mineral source). As used herein, the term "oleophilic absorber" comprises an oleophilic material that is either an oleophilic substance or that is a composite which comprises an oleophilic substance, said composite formed by depositing the oleophilic substance on a substrate surface, admixing the oleophilic substance with a substrate and/or chemical bonding of the oleophilic substance to a substrate.

In embodiments, the environmentally benign extractants are added to the hydrocarbon-contaminated solids as a first step, followed by the introduction of the oleophilic absorber. In embodiments, the two agents (extractant and absorber) can be added substantially simultaneously. The oleophilic absorber, after use, can be disposed of in an environmentally responsible way. In other embodiments, the hydrocarbon contaminants can be removed from the oleophilic absorber and reused or recycled.

Use of the environmentally benign extractants and oleophilic absorbents as disclosed herein can be exemplified by reference to their use in treating the hydrocarbon-contaminated solid materials found in drilling cuttings. In embodiments, the systems and methods disclosed herein can be applied to the cleaning of any hydrocarbon-coated particulate matter formed during oil and gas production however. The use of these systems and methods for treating cuttings chips coated with hydrocarbons (e.g., from oil-based drilling fluids and/or from the borehole) are described in detail herein, but it would be understood by those of ordinary skill in the art that these systems and methods can be used for treatment of various other hydrocarbon-coated particulate matter, such as that produced during well fracturing, oil and gas production, separation of oil/water/solids/gas after recovery, accidental discharges, and transportation/handling of the petroleum product.

B. Cuttings Clean-Up

In embodiments, the combination of an environmentally benign extractant and an oleophilic absorber can reduce the TPH content of cuttings contaminated with hydrocarbons (e.g., from oil-based drilling fluids and/or from the borehole) to levels below the regulatory limit of 1%. In embodiments, the oleophilic absorber used for these systems and methods can be cleaned on-site and recycled, with about 10% of the original absorber material requiring disposal as waste. In embodiments, the waste material from the cleaning process can be burned on-site to generate energy, or can be transported off-site for disposal.

1. Environmentally Benign Extractants

In embodiments, an environmentaly benign extractant in liquid form can be used to reduce the viscosity of the oil-based drilling mud or other hydrocarbon contaminant found on the surface of drilling cuttings. When the viscosity of this coating layer is reduced, the removal process is facilitated. An appropriately selected extractant, preferably having low ecotoxicity and a high flash point, can be used to solubilize the oil base of the drilling mud to help it flow away from the surface of the cuttings. In embodiments, the environmentally benign extractant can be a natural product, or derived from natural products. Because the cutting surface is oil-wet, the cuttings may retain some of the extractant after the majority of the oil-based drilling mud is removed. The cuttings with residual extractant can be treated by distillation or mechanical separation to separate residual extractant. Use of an extractant at a fraction of the cuttings weight, for example 0.1 to 20% by weight, or preferably 1 to 5% by weight, decreases the amount of residual extractant on the cuttings. Moreover, because the extractant is environmentally benign, on-site disposal of cuttings chips bearing the extractant can conform to regulations for hazardous waste disposal. The extractant wash solution, containing extractant, dissolved hydrocarbons and suspended fines, can then be burned on-site as fuel or transported off-site for disposal. Examples of environmentally benign extractants include terpene substances such as pine oil or d-limonene, isoparaffins, alpha olefins, internal olefins, esters like ethyl lactate, methyl soyate and biodiesel, and the like.

2. Oleophilic Absorbers

An oleophilic absorber can be used to remove hydrocarbon contaminants (e.g., from oil-based drilling fluids and/or from the borehole) from the surface of drillings cuttings. As described, an oleophilic absorber, for example, contains an oleophilic material that is either an oleophilic substance, or that is a composite formed by the deposition of an oleophilic substance on a substrate surface. The oleophilic absorber can absorb the hydrocarbons from the cuttings chips, leaving the cuttings in a clean state. Advantageously, an oleophilic absorber can be an oil-swellable oleophilic substance, for example, certain elastomers, styrene/butadiene resin, styrene/butadiene/styrene block copolymer, and styrene ethylene butadiene copolymer and a combination of any of thereof, An oil-swellable oleophilic substance can be a material that has the ability to expand in volume upon absorption of hydrocarbons. In embodiments, the swellable material can expand in volume by 1 to 100% upon absorption of hydrocarbons. In embodiments, the oleophilic absorber can be less dense than water, so that it can float on water or brine for easy separation from the dense cleaned cuttings. In embodiments, the spent oleophilic absorber can be burned, cleaned and reused, or properly disposed of. As examples, oleophilic absorbers can include materials such as thermoplastic polymers (e.g., polyethylene, polypropylene, styrene/butadiene, styrene/butadiene/styrene, polyisoprene, polyethylene terephthalate, polystyrene, ABS, SAN, EVA), crumb rubber, modified crumb rubber, devulcanized crumb rubber, hydrophobic starches, hydrophobic cellulosic materials, waxes (e.g., paraffin, beeswax, microcrystalline wax, etc.), zein, and the like. The oleophilic absorber should be of a size and shape that it delivers the oleophilic material to the hydrocarbon-coated cuttings chips, without getting trapped within the hydrocarbon coating layer itself. Oleophilic absorbers can be of any size or shape that conforms to this requirement, for example in the range of 0.1 to 10 millimeters (mm) diameter. Advantageously, oleophilic absorbers can be formed as beads such as polypropylene, polyethylene, polyisoprene, polystyrene, polybutadiene, and copolymers thereof In embodiments, the absorber can comprise a substrate with an oleophilic coating. The substrate can be, for example, glass beads or organic biomass having a hollow or porous configuration. The biomass substrate can be derived from materials such as bagasse, nut shells, and agricultural residue. The coating can be a polymer such as chitosan or polyvinylacetate, polystyrene, a silane, or styrene butadiene resin. Specific coatings can be selected for attachment to a particular substrate, and coatings can be selected having affinity for a particular set of hydrocarbons to be absorbed. In embodiments, the coating can be crosslinked so that it is not desorbed during its use in the cuttings cleaning process.

In embodiments, substrates for oleophilic absorbers can be formed from inorganic or organic materials or any mixture thereof. In embodiments, inorganic materials can include vitreous materials such as glass or ceramics.

In embodiments, organic substrates can include carbonaceous materials such as carbon black, graphite, carbon fibers, activated carbon, lignite, carbon microparticles, and carbon nanoparticles, for example carbon nanotubes. Organic substrates can include materials such as starch, modified starch, nut shells, cellulose, and the like. Organic substrates can be formed in any shape, including solid bodies like beads, hollow bodies like spheres, fibers, or any other suitable shape.

In embodiments, organic substrates can include plastic materials made from thermoset or thermoplastic resins. Plastic materials can be formed from a variety of polymers. A polymer useful as a plastic material may be a homopolymer or a copolymer. Copolymers can include block copolymers, graft copolymers, and interpolymers. In embodiments, suitable plastics may include, for example, addition polymers (e.g., polymers of ethylenically unsaturated monomers), polyesters, polyurethanes, aramid resins, acetal resins, formaldehyde resins, and the like. Additional polymers can include, for example, polyolefins, polystyrene, and vinyl polymers. Polyolefins can include, in embodiments, polymers prepared from $C_2$-$C_{10}$ olefin monomers, e.g., ethylene, propylene, butylene, dicyclopentadiene, and the like. In embodiments, poly(vinyl chloride) polymers, acrylonitrile polymers, and the like can be used. In embodiments, useful polymers for the formation of oleophilic substrates may be formed by condensation reaction of a polyhydric compound (e.g., an alkylene glycol, a polyether alcohol, or the like) with one or more polycarboxylic acids. Polyethylene terephthalate is an example of a suitable polyester resin. Polyurethane resins can include, e.g., polyether polyurethanes and polyester polyurethanes. Plastics may also be obtained for these uses from waste plastic, such as post-consumer waste including plastic bags, containers, bottles made of high density polyethylene, polyethylene grocery store bags, and the like.

In embodiments, organic substrates can comprise materials such as cellulosic and lignocellulosic materials. Cellulose or papermill sludge can be used as a substrate, to be coated with a suitable oleophilic material. Organic substrates can be derived from various forms of organic waste, including biomass and including particulate matter from post-consumer waste items such as old tires and carpeting materials.

In embodiments, organic substrates can be formed from materials of animal or vegetable origin. For example, animal sources for substrates can include materials from any part of a vertebrate or invertebrate animal, fish, bird, or insect. Such materials typically comprise proteins, e.g., animal fur, animal hair, animal hoofs, and the like. Animal sources can include any part of the animal's body, as might be produced as a waste product from animal husbandry, farming, meat production, fish production or the like, e.g., catgut, sinew, hoofs, cartilaginous products, etc. Animal sources can include the dried saliva or other excretions of insects or their cocoons, e.g., silk obtained from silkworm cocoons or spider's silk. Animal sources can be derived from feathers of birds or scales of fish.

As another example, vegetable sources for substrates can include materials that are predominately cellulosic, e.g., derived from cotton, jute, flax, hemp, sisal, ramie, and the like. Vegetable sources can be derived from seeds or seed cases, such as cotton or kapok, or from nuts or nutshells. Vegetable sources can include the waste materials from agriculture, such as corn stalks, stalks from grain, hay, straw, or sugar cane (e.g., bagasse). Vegetable sources can include leaves, such as sisal, agave, deciduous leaves from trees, shrubs and the like, leaves or needles from coniferous plants, and leaves from grasses. Vegetable sources can include fibers derived from the skin or bast surrounding the stem of a plant, such as flax, jute, kenaf, hemp, ramie, rattan, soybean husks, vines or banana plants. Vegetable sources can include fruits of plants or seeds, such as coconuts, peach pits, mango seeds, and the like. Vegetable sources can include the stalks or stems of a plant, such as wheat, rice, barley, bamboo, and grasses. Vegetable sources can include wood, wood processing products such as sawdust, and wood, and wood byproducts such as lignin.

3. Combined Processes

In embodiments, a system or method can be designed combining the use of the environmentally benign extractant and the oleophilic absorber. In a two-component system, less environmentally benign extractant may be used for reducing the viscosity of the hydrocarbon contaminants (e.g., from oil-based drilling fluids and/or from the borehole) on the surface of the drillings cuttings. For example, 1 to 5% of total cuttings weight in environmentally benign extractant can be added to make the hydrocarbon contaminant coating the cuttings surface sufficiently fluid that it can be absorbed by an oleophilic absorber. In embodiments, the clay fines within the oil-based mud can also adhere to the solid absorber surface as the hydrocarbon contaminants are transferred from the cutting surface to the surface of the absorber. A final separation of the cleaned cuttings chips and the oil-bearing absorbers can be achieved by means of density separation, such as flotation in brine solution, by fluidized bed separation, by size classification, by forced air separation, or by any other means familiar to those of ordinary skill in the art. Hydrocarbon-bearing absorbers can be cleaned for re-use by washing, for example in a base-oil-compatible solvent, with the resulting wash fluid being burned on-site, transported off-site, distilled and recycled, or otherwise disposed of. The recovered hydrocarbon contaminant (e.g., base oil from cuttings) may be reused if it is of sufficient purity, for example to form oil-based muds.

EXAMPLES

The following materials were used in the Examples below:
Oil-based mud coated cuttings, representative of cuttings from Gulf of Mexico offshore oil drilling;
d-limonene, Fluka Chemicals (St. Louis, Mo.);
Tergitol 15-S-7 Surfactant, Dow Chemical Company (Midland, Mich.);
Potassium Chloride, Sigma Aldrich (St. Louis, Mo.);
Styrene Ethylene Butylene Copolymer Beads, Kraton Polymers, LLC (Belpre, Ohio);
Polyisoprene Beads, Kraton Polymers, LLC (Belpre, Ohio);
Poly(styrene-co-butadiene) (4% butadiene) Beads, Sigma Aldrich (St. Louis, Mo.);
Polystyrene-block-polyisoprene-block-polystyrene (22% styrene) Beads, Sigma Aldrich (St. Louis, Mo.);
Polystyrene-block-polybutadiene (30% styrene) Beads, Sigma Aldrich (St. Louis, Mo.);
Isomerized Olefin Base Oil, Chevron;
Cellulose Acetate Cigarette Filters, Eastman Chemical Company (Kingsport, Tenn.);
Ground Rice Hulls, Rice Hull Specialty Products (Stuttgart, Ark.);
Crumb Rubber, International Recycled Products LLC (Wixom, Mich.);
Styrene-butadiene block copolymer (28% styrene), Scientific Polymer Products (Ontario, N.Y.);
Ethylene Vinyl Acetate (28% vinyl acetate), TDL Plastics (Corpus Christi, Tex.);
Poly(diallyldimethylammonium chloride), Sigma-Aldrich (St. Louis, Mo.); and
Bagasse (from a sugar processing plant).

Example 1

A sample of oil-based mud coated cuttings ("OBM cuttings") was placed in a Retort Distillation Apparatus (OFI Testing Equipment INC, Houston Tex.) ("retort") and heated to 700 degrees Fahrenheit separating the sample into oil, water and solid fractions. The composition of the sample was 3.6% oil, 85.9% solids and remainder water, by weight. The total weight of oil over weight of oil plus solids or total percentage hydrocarbon ("TPH") was 4.0%.

Example 2

A 75 gram (gm) sample of OBM cuttings was placed in a glass jar with 150 grams of 1% (by weight) Tergitol 15-S-7 (commercially available surfactant) aqueous solution. The jar was capped and shaken vigorously for five minutes, suspending a small portion of the solids into the water. The sample jar was then left for ten minutes to settle. The water layer was decanted off the top of the solids, which were then collected and heated in the retort. The TPH was calculated at 3.7%.

Example 3

A 75 gm sample of OBM cuttings was placed in a jar with a 100 gram sample of neat d-limonene. The jar was capped and shaken for five minutes, then left to settle for ten minutes. The supernatant d-limonene solution was opaque, containing some of the mineral fines from the surface of the OBM cuttings. The settled dark-grey cuttings chips were recovered from the bottom of the jar and heated in the retort. The TPH was measured at 11.25%, indicating the oil fraction to contain both oil from the OBM cuttings and solvent from the d-limonene wash. By measuring the relative densities of the OBM cuttings oil and the d-limonene, it was determined that the TPH measurement could be broken down into 10.75% d-limonene and 0.5% base oil on the cuttings. Solvent recovery from the washed cuttings can be carried out by mechanical or thermal means, leaving the residual 0.5% of base oil to be disposed of.

Example 4

Six separate samples of OBM cuttings, each weighing 50 gms, were mixed with six different samples of untreated polymer beads of 2-5 mm diameter: polystyrene ethylene butylene copolymer ("PEBc"), polyisoprene ("PI"), poly(styrene-co-butadiene) ("PSB"), Polystyrene-block-polyisoprene-block-polystyrene ("PSPI"), and Polystyrene-block-polybutadiene ("PSPB"). Each sample was combined, in dry form, in a jar and shaken for five minutes to ensure adequate exposure of the OBM cutting surface to the bead surface. Following mixing, a 15% by weight aqueous solution of potassium chloride was added to the jar to float the polymer beads off the cuttings. The polymer beads and water layers were decanted and the residual cuttings solid was collected and measured for composition in the retort. The following TPH measurements were obtained when the cuttings solid from each bead treatment was analyzed: treatments of dry polymer PEBc, PI and PSB produced the following TPH results: 2.4% (PEBc), 2.3% (PI), 3.8% (PSB), 2.8% (PSPI), and 2.7% (PSPB) respectively.

Example 5

A sample of 25 gms of untreated PEBc beads of 2 to 5 mm diameter was combined with 1 gram of d-limonene in a jar and shaken for one minute. A 50 gm sample of OBM cuttings was then mixed with the d-limonene-treaded PEBc beads in a jar and shaken for five minutes to ensure adequate exposure of the OBM cutting surface to the bead surface. Following mixing, a 15% (by weight) aqueous solution of potassium chloride was added to the jar to float the polymer beads off the cuttings. The polymer beads and water layers were decanted and the residual cuttings solid was collected and measure for composition in the retort. The TPH for this sample was 2.9%.

Example 6

Four 50 gm samples of OBM cuttings were combined in individual jars with the following amounts of d-limonene: 0.5 grams, 1 gram, 2 grams, and 5 grams. Each sample was shaken for one minute to ensure proper dispersion of the d-limonene throughout the cuttings sample. 25 gms of PEBc beads of 2-5 mm diameter were added to each jar, and each jar was shaken for an additional five minutes to ensure adequate exposure of the OBM cutting surface to the bead surface. Following mixing, a 15% by weight aqueous solution of potassium chloride was added to the jar to float the polymer beads off the cuttings. The polymer beads and water layers were decanted and the residual cuttings solid was collected and measured for composition in the retort. The TPH for these samples were: 2.6%, 1.3%, 1.5%, and 1.7% respectively.

Example 7

Seven separate samples of OBM cuttings, each 50 gms, were combined in individual jars with 1 gm of d-limonene per jar. Each jar was then shaken for one minute to ensure proper dispersion of the d-limonene throughout the cuttings sample. 25 grams of PEBc beads of 2 to 5 mm diameter were added to each jar and each were shaken for an additional two and half or five minutes. Then selected samples were allowed to rest for additional periods of time before separating the polymer beads from the cuttings, according to the following schedule:
Sample 1. 2.5 minute shake, no rest
Sample 2. 5 minute shake, no rest
Sample 3. 5 minute shake, 10 minute rest
Sample 4. 5 minute shake, 25 minute rest
Sample 5. 5 minute shake, 55 minute rest
Sample 6. 5 minute shake, 24 hour rest
Sample 7. 5 minute shake, 96 hour rest To separate the polymer beads from the cuttings, a 15% by weight aqueous solution of potassium chloride was added to each jar to float and easily remove the polymer beads off of the cuttings. The polymer beads and water layers were decanted and the residual cuttings solid was collected and measured for composition in the retort. The TPH for these samples were: 2.1%, 1.3%, 2.7%, 1.5%, 1.1%, 1.5%, and 0.6%, respectively.

Example 8

Approximately 7 gms of cellulose acetate fibers (sourced from cigarette filter plug material) were cut into pieces about ¼" in length. A sample of OBM cuttings, 50 gms, was combined in a jar with 1 gm of base oil. The jar was shaken by hand for approximately 30 seconds. The cellulose acetate fibers were added to the jar and the jar was shaken by hand for approximately 5 minutes. The contents of the jar were then emptied onto a watch glass and the fibers were removed. The remaining cuttings were collected and measured for composition in the retort. The TPH for this sample was 2.9%.

Example 9

Two samples of OBM cuttings, 50 gms, were combined in individual jars with 1 gm base oil and shaken for 1 minute. Bagasse and ground bagasse (achieved by processing bagasse for approximately 45 seconds in a high speed blender) samples, approximately 9 gms each were mixed with the OBM cuttings samples and shaken for 5 minutes. The bagasse was then removed from the cuttings via forced air separation. The remaining cuttings were collected and measured for composition in the retort. The TPH for these samples were 3.5% and 3.5% respectively.

Example 10

Two samples of OBM cuttings, 50 gms, were combined in individual jars with 1 gm base oil and shaken for 1 minute. Ground rice hull (16/80 mesh) samples, unmodified and modified with poly-DADMAC, were added to the cuttings in the amount of 15 gms and 8 gms respectively. The mixtures were shaken for 5 minutes. The rice hulls were removed from the cuttings via forced air separation and the remaining cuttings collected and measured for composition in the retort. Treatments of unmodified rice hulls and modified rice hulls produced the following TPH for these samples were 4.6% and 3.4% respectively.

Example 11

Four samples of OBM cuttings, 50 gms, were combined in individual jars with 1 gm base oil, shaken for 1 minute and then mixed with four different polymeric beads/particles: polystyrene ethylene butylene copolymer ("PEBc"), polystyrene butadiene ABA block copolymer ("PSBS"), crumb rubber ("CR"), and polyethylene vinyl acetate ("PEVA"). Each sample was shaken for 5 minutes and poured into an 18% KCl brine to separate the cuttings from the polymer. The polymer particles/beads and water were decanted off and the cuttings were collected and measured for composition in the retort. Treatments of PEBc, PSBS, CR and PEVA produced the following TPH results: 2.0%, 1.9%, 3.0% and 3.3% respectively.

Example 12

Six separate samples of OBM cuttings, each weighing 50 gms, were mixed with 1 gm of base oil and 12.5 gm samples of untreated PEBc beads and allowed to rest for a time of 6, 18, or 24 hours at a temperature of 40° C. or 60° C. Mixture of cuttings, base oil and PEBc beads were shaken by hand for 5 minutes and then placed in an oven at either 40° C. or 60° C. to rest for an additional period of time before separating the polymer beads from the cuttings, according to the following schedule:

Sample 1: 6 hours at 40° C.
Sample 2: 18 hours at 40° C.
Sample 3: 24 hours at 40° C.
Sample 4: 6 hours at 60° C.
Sample 5: 18 hours at 60° C.
Sample 6: 24 hours at 60° C.

To separate the polymer beads from the cuttings, a 15% by weight aqueous solution of potassium chloride was added to each jar to float and easily remove the polymer beads off of the cuttings. The polymer beads and water layers were decanted and the residual cuttings solid was collected and measured for composition in the retort. The TPH for these samples were: 1.5%, 0.9%, 0.6%, 1.6%, 0.9%, and 0.3% respectively.

EQUIVALENTS

While specific embodiments of the subject invention have been discussed, the above specification is illustrative and not restrictive. Many variations of the invention will become apparent to those skilled in the art upon review of this specification. Unless otherwise indicated, all numbers expressing quantities of ingredients, reaction conditions, and so forth used in the specification and claims are to be understood as being modified in all instances by the term "about." Accordingly, unless indicated to the contrary, the numerical parameters set forth herein are approximations that can vary depending upon the desired properties sought to be obtained by the present invention.

While this invention has been particularly shown and described with references to preferred embodiments thereof, it will be understood by those skilled in the art that various changes in form and details may be made therein without departing from the scope of the invention encompassed by the appended claims.

What is claimed:

1. A method for separating a hydrocarbon contaminant from a contaminated solid, the contaminated solid comprising a solid substrate and the hydrocarbon contaminant, the method comprising:
   providing an environmentally benign extractant selected from the group consisting of a terpene, an isoparaffin, an alpha olefin, an internal olefins, an ester, and a biodiesel,
   mixing the environmentally benign extractant with the contaminated solid to produce a treated solid wherein the hydrocarbon contaminant is separable from the solid substrate,
   providing an oleophilic absorber, wherein the oleophilic absorber comprises an oleophilic material selected from the group consisting of crumb rubber, modified crumb rubber, thermoplastic elastomers, and polymers and copolymers of styrene, butadiene, isoprene, ethylene, and vinyl acetate;
   mixing the oleophilic absorber with the treated solid to extract the hydrocarbon contaminant from the solid substrate onto the oleophilic absorber, thereby forming a spent oleophilic absorber which comprises the hydrocarbon contaminant, and
   separating the spent oleophilic absorber from the treated solid, thereby separating the hydrocarbon contaminant from the solid substrate.

2. The method of claim 1, wherein the contaminated solid comprises drilling cuttings.

3. The method of claim 1, wherein the oleophilic absorber comprises the oleophilic material on a substrate surface.

4. The method of claim 1, wherein the oleophilic absorber comprises beads coated with the oleophilic material.

5. The method of claim 1, further comprising separating the hydrocarbon contaminant from the spent oleophilic absorber.

6. The method of claim 1, further comprising recovering the environmentally benign extractant from the spent oleophilic absorber.

7. The method of claim 1, further comprising disposing of the spent oleophilic absorber.

8. A method of treating drilling cuttings contaminated with a hydrocarbon contaminant, comprising: (a) washing the drilling cuttings with an environmentally benign extractant selected from the group consisting of a terpene, an isoparaffin, an alpha olefin, an internal olefin, an ester, and a biodiesel, and (b) adding an oleophilic absorber to the drilling cuttings after Step (a), wherein the oleophilic absorber absorbs the hydrocarbon contaminant from the drilling cuttings and wherein the oleophilic absorber comprises an oleophilic material selected from the group consisting of crumb rubber, modified crumb rubber, thermoplastic elastomers, and polymers and copolymers of styrene, butadiene, isoprene, ethylene, and vinyl acetate.

9. The method of claim 8, further comprising:
   (c) the step of segregating the oleophilic absorber from the drilling cuttings after Step (b).

10. The method of claim 9, further comprising:
    (d) the step of separating the hydrocarbon contaminant from the oleophilic absorber after Step (c).

11. The method of claim 9, further comprising disposing of the oleophilic absorber after Step (c).

12. The method of claim 1, wherein the oleophilic absorber comprises a substrate bearing a coating of an oleophilic material.

13. The method of claim 1, wherein the oleophilic absorber comprises an uncoated oleophilic material.

14. The method of claim 1, wherein the oleophilic absorber comprises an oil-swellable oleophilic material.

15. The method of claim 1, wherein the oleophilic absorber is less dense than water.

16. The method of claim 1, wherein the oleophilic absorber comprises a polymeric bead.

17. The method of claim 1, wherein the environmentally benign extractant is a biodegradable material.

18. The method of claim 1, wherein the environmentally benign extractant is a naturally-derived material.

19. The method of claim 1, wherein the terpene is selected from the group consisting of pine oil and d-limonene.

20. The method of claim 1, wherein the ester is selected from the group consisting of ethyl lactate and methyl soyate.

21. The method of claim 1, wherein the oleophilic material is selected from the group consisting of styrene/butadiene resin, styrene/butadiene/styrene block copolymer, and styrene ethylene butadiene copolymer, and a combination of any of thereof.

22. The method of claim 1, wherein the oleophilic material is selected from the group consisting of polyethylene, polypropylene, styrene/butadiene, styrene/butadiene/styrene, polyisoprene, polyethylene terephthalate, polystyrene, ABS, SAN and EVA.

23. The method of claim 1, wherein the oleophilic absorber are beads made from a polymer selected from the group consisting of polypropylene, polyethylene, polyisoprene, polystyrene, polybutadiene, and copolymers thereof.

24. The method of claim 8, wherein the terpene is selected from the group consisting of pine oil and d-limonene.

25. The method of claim 8, wherein the ester is selected from the group consisting of ethyl lactate and methyl soyate.

26. The method of claim 8, wherein the oleophilic material is selected from the group consisting of styrene/butadiene resin, styrene/butadiene/styrene block copolymer, and styrene ethylene butadiene copolymer, and a combination of any of thereof.

27. The method of claim 8, wherein the oleophilic material is selected from the group consisting of polyethylene, polypropylene, styrene/butadiene, styrene/butadiene/styrene, polyisoprene, polyethylene terephthalate, polystyrene, ABS, SAN and EVA.

28. The method of claim 8, wherein the oleophilic absorber are beads made from a polymer selected from the group consisting of polypropylene, polyethylene, polyisoprene, polystyrene, polybutadiene, and copolymers thereof.

* * * * *